US008333109B2

(12) United States Patent

Migueis et al.

(10) Patent No.: US 8,333,109 B2

(45) Date of Patent: Dec. 18, 2012

(54) METHOD AND DEVICE FOR DIAGNOSING AN INJECTION VALVE, CONNECTED TO A FUEL RAIL, OF AN INTERNAL COMBUSTION ENGINE

(75) Inventors: Carlos Eduardo Migueis, Tegernheim (DE); Michael Stahl, Bogen (DE); Matthias Wiese, Aschaffenburg (DE)

(73) Assignee: Continental Automotive GmbH, Hannover (DE)

( * ) Notice: Subject to any disclaimer, the term of this patent is extended or adjusted under 35 U.S.C. 154(b) by 384 days.

(21) Appl. No.: 12/665,138

(22) PCT Filed: Jun. 11, 2008

(86) PCT No.: PCT/EP2008/057264

§ 371 (c)(1), (2), (4) Date: May 25, 2010

(87) PCT Pub. No.: WO2009/000647

PCT Pub. Date: Dec. 31, 2008

(65) Prior Publication Data

US 2010/0251809 A1 Oct. 7, 2010

(30) Foreign Application Priority Data

Jun. 22, 2007 (DE) ......................... 10 2007 028 900

(51) Int. Cl.
*G01M 15/09* (2006.01)

(52) U.S. Cl. .................................. 73/114.45; 73/114.43

(58) Field of Classification Search ............... 73/114.38, 73/114.42, 114.43, 114.45, 114.48, 114.51
See application file for complete search history.

(56) References Cited

U.S. PATENT DOCUMENTS

| | | | | |
|---|---|---|---|---|
| 5,616,837 | A * | 4/1997 | Leonard et al. | 73/114.43 |
| 5,633,458 | A * | 5/1997 | Pauli et al. | 73/114.51 |
| 5,708,202 | A | 1/1998 | Augustin et al. | 73/119 |
| 5,974,865 | A * | 11/1999 | Dambach | 73/49.7 |
| 6,755,077 | B2 * | 6/2004 | Clingerman et al. | 73/114.51 |
| 6,964,261 | B2 | 11/2005 | Warnc et al. | 123/436 |
| 7,690,364 | B2 * | 4/2010 | Grunwald et al. | 123/520 |

(Continued)

FOREIGN PATENT DOCUMENTS

| | | |
|---|---|---|
| DE | 19925099 | 12/2000 |
| EP | 0748930 | 12/1996 |
| EP | 0860600 | 8/1998 |
| JP | 2000274297 | 10/2000 |

OTHER PUBLICATIONS

International Search Report and Written Opinion for Application No. PCT/EP2008/057264 (12 pages), Dec. 3, 2008.

German Office Action, German Patent Application No. 10 2007 028 900.8, 5 pages, Aug. 23, 2012.

*Primary Examiner* — Eric S McCall

(74) *Attorney, Agent, or Firm* — King & Spalding L.L.P.

(57) ABSTRACT

In a method for diagnosing an injection valve (5), in an overrun fuel cut-off phase the fuel supply to the fuel rail (4) is closed, and after the fuel supply has been closed off a first fuel pressure in the fuel rail (4) is measured, and after the first measurement of the fuel pressure an injection valve (5) is actuated for a test injection. After the test injection a second fuel pressure in the fuel rail (4) is measured, a differential pressure value (ΔP) is formed from the first and second measured fuel pressures and a difference of an operating parameter from a reference parameter is determined from the differential pressure value (ΔP), and when a previously defined maximum difference is exceeded the injection valve (5) is detected as being defective.

26 Claims, 2 Drawing Sheets

U.S. PATENT DOCUMENTS

| | | | | |
|---|---|---|---|---|
| 7,765,995 | B2 * | 8/2010 | Nakata et al. | 123/673 |
| 7,913,666 | B2 | 3/2011 | Achleitner et al. | 123/447 |
| 2003/0226399 | A1 * | 12/2003 | Clingerman et al. | 73/119 A |
| 2007/0056561 | A1 * | 3/2007 | Dolker | 123/458 |
| 2010/0121600 | A1 * | 5/2010 | Zieher | 702/98 |
| 2012/0118053 | A1 * | 5/2012 | Serra et al. | 73/114.51 |

* cited by examiner

METHOD AND DEVICE FOR DIAGNOSING AN INJECTION VALVE, CONNECTED TO A FUEL RAIL, OF AN INTERNAL COMBUSTION ENGINE

CROSS-REFERENCE TO RELATED APPLICATIONS

This application is a U.S. National Stage Application of International Application No. PCT/EP2008/057264 filed Jun. 11, 2008, which designates the United States of America, and claims priority to German Application No. 10 2007 028 900.8 filed Jun. 22, 2007, the contents of which are hereby incorporated by reference in their entirety.

TECHNICAL FIELD

The present invention relates to a method for diagnosing an injection valve of an internal combustion engine connected to a fuel rail.

BACKGROUND

The invention also relates to an apparatus for diagnosing an injection valve of an internal combustion engine connected to a fuel rail, with a pressure measuring facility, which is configured to measure a fuel pressure in the fuel rail, and with a control facility.

In modern internal combustion engines the fuel to be injected by the injection valves into the combustion chamber of the cylinders of the internal combustion engine is frequently supplied by way of a fuel rail. The fuel rail is connected to a fuel, in particular a high-pressure fuel, supply. Connected in turn to the fuel rail are individual injection valves, which can be actuated to inject certain quantities of fuel by means of suitable control facilities. Such internal combustion engines can be both diesel and gas combustion engines. The injection system can be a so-called common rail injection system for example.

Because of their complex production methods and the different conditions for their deployment, injection valves are subject to major influences in respect of their operating behavior. In particular there is frequently some variance in respect of their operating specifications. Such variances or irregularities cause irregular metering of the fuel mixture and result in the internal combustion engine having higher emissions and not running smoothly, these factors generally being associated with lower efficiency. The variances can be manufacturing tolerances for example, in other words individual deviations of the injection values due to the manufacturing tolerances. Such manufacturing tolerances can be determined by measurement once the valve has been produced and be compensated for by calibration in the engine control unit. Aging phenomena are another type of variance, showing consistent behavior over the service life of the valve, which can be determined for example by long-term measurements so that a modeling of nominal valve behavior can be stored in the control unit.

Two methods are known as equalization functions for injection valves, to compensate for aging phenomena and manufacturing tolerances by adapting the injection time over the entire characteristic flow line of the valve.

One method is the so-called cylinder-selective lambda regulation, which uses one lambda sensor for each exhaust gas bank, said lambda sensor detecting a relative deviation of the cylinders from one another by comparing a cylinder-specific lambda sensor model and the cylinder-specific lambda sensor signal. Assuming that all the cylinders of the internal combustion engine have a regularly distributed air mass flow $\dot{m}_{air}$, it is possible to calculate a mean fuel mass flow $\dot{m}_{fuel}$ from the measured lambda value λ and the known stoichiometric ratio c using the following formula:

$$\lambda = \frac{\dot{m}_{air}}{\dot{m}_{fuel} \cdot c}.$$

With this known method it is possible to work out the injected fuel mass of each cylinder from the deviation of the cylinder-specific lambda signal from the mean lambda regulator value and adapt the injection correction values on a cylinder-specific basis based on this criterion. However this method cannot be used to diagnose the fuel injectors, as a deviation of the cylinder-specific lambda regulation can originate from both the air and the fuel path and so unique localization of the error site is not guaranteed. This diagnosis method also has limited application in modern turbocharged engines, if the lambda sensor is positioned downstream of the turbocharger.

The second known method uses cylinder-specific uneven running for an adaptation of cylinder-specific injection correction values. The angular acceleration α of the crankshaft, which varies over time, is a measure of the uneven running of the internal combustion engine here and describes the mean induced torque M of each cylinder. The following relationship is used here:

$$M=\alpha\cdot\Theta.$$

Since the rotational inertia mass θ is considered to be constant, there is a linear relationship between the measurable angular acceleration and the induced torque. With constant ignition parameters and assuming a constant and regularly distributed air mass flow, the mean induced torque is thus obtained as a function of the injected fuel mass by way of each cylinder. The cylinder-specific uneven running is used to modify an individual fuel injection time for the same fuel mass until the deviation from the individual cylinders in respect of uneven running reaches a minimum. This correction is stored in the engine control unit as an adaptation value. However this method cannot be used to diagnose fuel injectors, as a deviation of cylinder-specific uneven running can originate from both the air and the fuel path and so unique localization of the error site is not guaranteed.

With both known methods adaptation values are determined for injection into individual cylinders. Both methods are thus able to correct constant aging phenomena. However they do not offer the possibility of diagnosing a rapidly occurring defect of an injection valve, as unique localization of the error site is not guaranteed.

An apparatus and method for controlling a fuel injector are also known from U.S. Pat. No. 6,964,261 B2. Here a quantity of fuel is injected during a so-called zero fuel condition. A pressure drop in a fuel rail corresponding to the injected quantity of fuel is detected and a change in the engine speed is determined according to the fuel injection. The fuel injection is adjusted as a function of the pressure drop in the rail and the corresponding change in the engine speed. Aging phenomena of the injector can be detected using the known method. However rapidly occurring changes in the injection valve due to a defect are again not taken into account with the method.

SUMMARY

According to various embodiments, a method and apparatus of the type mentioned in the introduction can be specified, which can be used to diagnose in particular rapidly occurring defects of an injection valve independently of the exhaust gas system configuration of the internal combustion engine.

According to an embodiment, a method for diagnosing an injection valve of an internal combustion engine connected to a fuel rail, may comprise the following steps:—the fuel supply to the fuel rail is closed off in an overrun cut-off phase of the internal combustion engine,—after the fuel supply has been closed off, a first fuel pressure is measured in the fuel rail,—after the first fuel pressure measurement an injection valve is actuated for at least one test injection,—after the at least one test injection a second fuel pressure is measured in the fuel rail,—a differential pressure value is formed from the first and second measured fuel pressures,—a deviation of an operating parameter from a reference parameter is determined from the differential pressure value and if a previously defined maximum deviation of the operating parameter from the reference parameter is exceeded, the injection valve is identified as defective.

According to a further embodiment, the operating parameter may be the formed differential pressure value and the reference parameter is a setpoint differential pressure value between the fuel pressure in the fuel rail before and after the test injection. According to a further embodiment, the operating parameter can be a fuel quantity determined from the differential pressure value and actually injected during the test injection and the reference parameter is a setpoint fuel quantity to be injected during the test injection. According to a further embodiment, the injection valve can be actuated for a number of test injections, with a differential pressure value being formed for each of the test injections respectively from the first and second measured fuel pressures. According to a further embodiment, the operating parameter can be the variance of the formed differential pressure values and the reference parameter is a setpoint variance of the differential pressure values. According to a further embodiment, the operating parameter can be the variance of fuel quantities determined from the differential pressure values and actually injected during the test injection and the reference parameter is a setpoint variance of the fuel quantities. According to a further embodiment, at least two injection valves can be actuated one after the other for at least one test injection each, with a differential pressure value being formed for each of the injection valves respectively from the first and second measured fuel pressures. According to a further embodiment, the operating parameter can be the differential pressure value formed for the first injection valve and the reference parameter is the differential pressure value formed for the second injection valve. According to a further embodiment, the operating parameter can be a fuel quantity determined for the first injection valve from the respective differential pressure value and actually injected during the test injection and the reference parameter is a fuel quantity determined for the second injection valve from the respective differential pressure value and actually injected during the test injection. According to a further embodiment, each of the at least two injection valves may be actuated for a number of test injections, with a differential pressure value being formed for each of the test injections respectively from the first and second measured fuel pressures. According to a further embodiment, the operating parameter can be the variance of the differential pressure values formed for the first injection valve and the reference parameter is the variance of the differential pressure values formed for the second injection valve. According to a further embodiment, the operating parameter can be the variance of fuel quantities determined from the differential pressure values for the first injection valve and actually injected during the test injection and the reference parameter is the variance of fuel quantities determined from the differential pressure values for the second injection valve and actually injected during the test injection. According to a further embodiment, the maximum deviation can be at least 25%, preferably at least 50%.

According to another embodiment, an apparatus for diagnosing an injection valve of an internal combustion engine connected to a fuel rail, may comprise a pressure measuring facility, which is configured to measure a fuel pressure in the fuel rail and with a control facility, wherein the control facility is configured:—to close off the fuel supply to the fuel rail in an overrun cut-off phase of the internal combustion engine,—to actuate the pressure measuring facility such that it measures a first fuel pressure in the fuel rail after the fuel supply has been closed off,—to actuate an injection valve for at least one test injection after the first fuel pressure measurement,—to actuate the pressure measuring facility such that it measures a second fuel pressure in the fuel rail after the at least one test injection,—to form a differential pressure value from the first and second measured fuel pressures, and—to determine a deviation of an operating parameter from a reference parameter from the differential pressure value and, if a previously defined maximum deviation of the operating parameter from the reference parameter is exceeded, to identify the injection valve as defective.

According to a further embodiment, the operating parameter can be the formed differential pressure value and the reference parameter is a setpoint differential pressure value between the fuel pressure in the fuel rail before and after the test injection. According to a further embodiment, the operating parameter can be a fuel quantity determined from the differential pressure value and actually injected during the test injection and the reference parameter is a setpoint fuel quantity to be injected during the test injection. According to a further embodiment, the control facility can be configured to actuate the injection valve for a number of test injections and to form a differential pressure value for each of the test injections respectively from the first and second measured fuel pressures. According to a further embodiment, the operating parameter can be the variance of the formed differential pressure values and the reference parameter is a setpoint variance of the differential pressure values. According to a further embodiment, the operating parameter can be the variance of fuel quantities determined from the differential pressure values and actually injected during the test injection and the reference parameter is a setpoint variance of the fuel quantities. According to a further embodiment, the control facility can be configured to actuate at least two injection valves one after the other for at least one test injection each and to form a differential pressure value for each of the injection valves respectively from the first and second measured fuel pressures. According to a further embodiment, the operating parameter can be the differential pressure value formed for the first injection valve and the reference parameter is the differential pressure value formed for the second injection valve. According to a further embodiment, the operating parameter can be a fuel quantity determined for the first injection valve from the respective differential pressure value and actually injected during the test injection and the reference parameter is a fuel quantity determined for the second injection valve from the respective differential pressure value and actually injected during the test injection. According to a further embodiment, the control facility can be configured to actuate each of the at least two injection valves for a number of test injections and to form a differential pressure value for each of the test injections respectively from the first and second measured fuel pressures. According to a further embodiment, the operating parameter can be the variance of the differential pressure values formed for the first injection valve and the reference parameter is the variance of the differential pressure values formed for the second injection valve. According to a further embodiment, the operating parameter can be the variance of fuel quantities determined from the differential pressure values for the first injection valve and actually injected during the test injection and the reference parameter is the variance of fuel quantities determined from the differential pressure values for the second injection valve and actually injected during the test injection. According to a further embodiment, the maximum deviation can be at least 25%, preferably at least 50%.

BRIEF DESCRIPTION OF THE DRAWINGS

An exemplary embodiment is described in more detail below with reference to a schematic drawing, in which.

DETAILED DESCRIPTION

Figure 1:
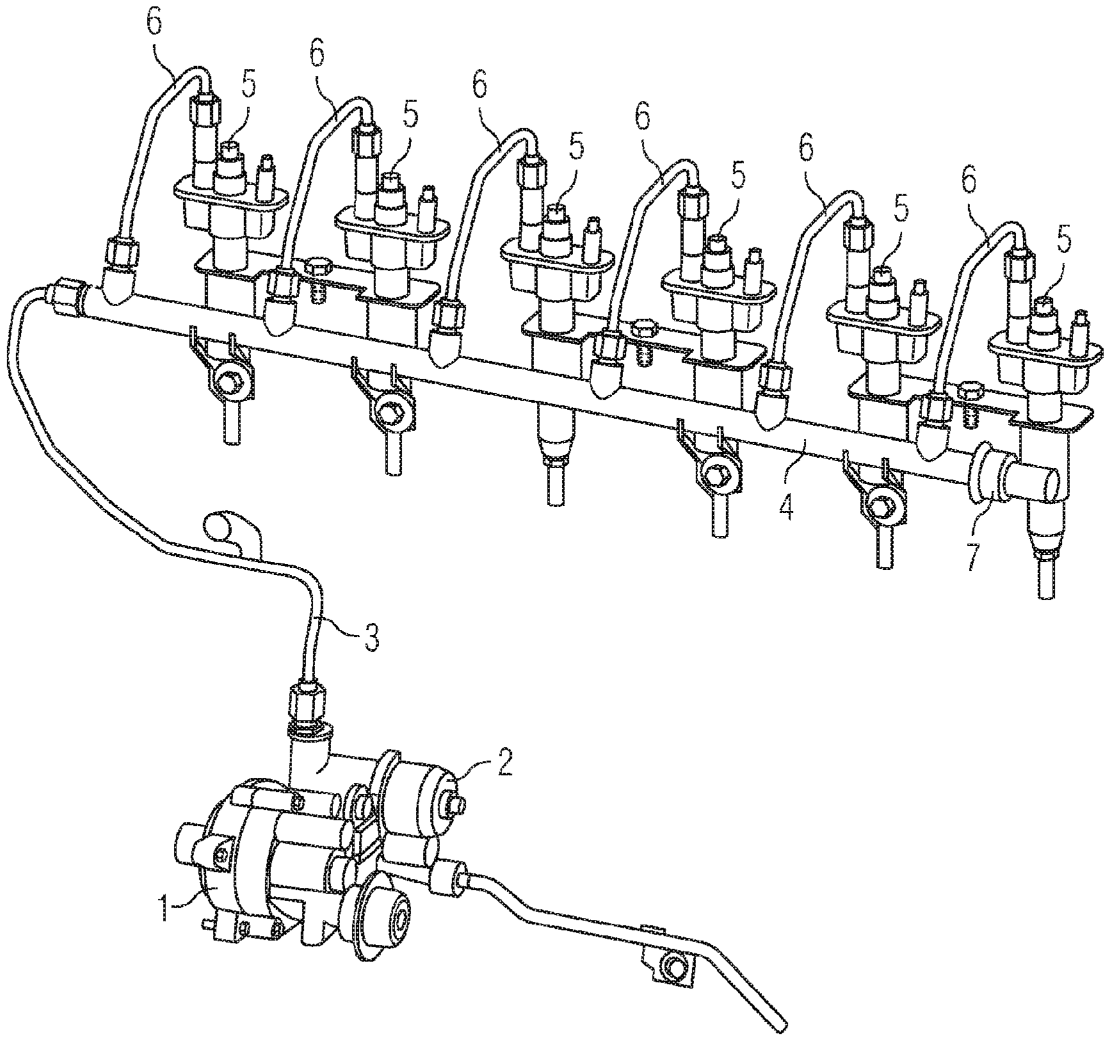
FIG. 1 shows a fuel distributor system of an internal combustion engine.

According to various embodiments, a method mentioned in the introduction may comprise the following steps:

- the fuel supply to the fuel rail is closed off in an overrun cut-off phase of the internal combustion engine,
- after the fuel supply has been closed off, a first fuel pressure is measured in the fuel rail,
- after the first fuel pressure measurement an injection valve is actuated for at least one test injection,
- after the at least one test injection a second fuel pressure is measured in the fuel rail,
- a differential pressure value is formed from the first and second measured fuel pressures,
- a deviation of an operating parameter from a reference parameter is determined from the differential pressure value and if a previously defined maximum deviation of the operating parameter from the reference parameter is exceeded, the injection valve is identified as defective.

According to various embodiments for the apparatus mentioned in the introduction, the control facility is configured:

- to close off the fuel supply to the fuel rail in an overrun cut-off phase of the internal combustion engine,
- to actuate the measuring facility such that it measures a first fuel pressure in the fuel rail after the fuel supply has been closed off,
- to actuate an injection valve for at least one test injection after the first fuel pressure measurement,
- to actuate the pressure measuring facility such that it measures a second fuel pressure in the fuel rail after the at least one test injection,
- to form a differential pressure value from the first and second measured fuel pressures, and
- to determine a deviation of an operating parameter from a reference parameter from the differential pressure value and, if a previously defined maximum deviation of the operating parameter from the reference parameter is exceeded, to identify the injection valve as defective.

The various embodiments therefore provide for forming a difference between the fuel pressure before and after a test injection and using this differential pressure value as a basis for determining a deviation of an operating parameter of the internal combustion engine from a reference parameter. A maximum permissible deviation of the operating parameter from the reference parameter is determined beforehand. If this maximum deviation for the tested injection valve is exceeded, the injection valve is identified as defective. According to various embodiments, therefore, rapidly occurring changes in the specification of the injection valve in particular are identified. The maximum deviation can be selected here as a function of the requirements relating to the stability of the injection valves. According to various embodiments, defect identification is triggered in the event of implausible deviations of the operating parameter from the reference parameter.

Defect phenomena impact on individual injection valves and demonstrate a behavior, which deviates significantly from the constant aging phenomena of the injection valves. Modeling of this unexpected behavior is impossible. A defect in this context refers in particular to rapidly occurring changes and not constant changes, such as aging phenomena for example.

The method according to various embodiments makes it possible to diagnose such defect phenomena and such significant deviations from normal aging of an injection valve. Appropriate countermeasures can be taken when an injection valve is identified as defective. Specific replacement of the defective injection valve allows emission increases and uneven running to be reduced. It is also possible for example to switch the internal combustion engine to emergency operation. It is possible in this process for example for the internal combustion engine only to be operated at a limited speed.

According to various embodiments, the deviation of the operating parameter from the reference parameter can also be used to calculate adaptation values, on the basis of which actuation of the tested injection valve is adapted at the next injection to compensate for the deviation of the operating parameter. If such adaptation values are implausible, in other words the deviation of the operating parameter from the reference parameter in particular exceeds the predefined maximum deviation, the valve can be diagnosed as defective. The predefined maximum deviation can be determined for example on the basis of a previously created characteristic field.

According to various embodiments, the test injection takes place in the overrun cut-off phase of the internal combustion engine, since in this phase the injection valves are normally not actuated. Interrupting the fuel supply to the fuel rail causes the fuel enclosed in the fuel rail to be kept at an almost constant level. It is advantageous here, after the fuel supply has been closed off before the first pressure measurement and the start of the test injection, to await a transient phase of the system, so that a stable state is present in the fuel injection system for the test injection.

The internal combustion engine in the present instance can be a diesel or gas internal combustion engine. The fuel rail can in particular be a common rail. The control facility can be an engine control unit (ECU) for example. The pressure measuring facility can in particular be a pressure sensor, in particular a high pressure sensor, positioned on the fuel rail.

The method according to various embodiments and/or apparatus can be used independently of the exhaust gas system configuration of the internal combustion engine. Neither a lambda sensor nor a speed sensor is then required from a purely physical point of view.

According to various embodiments, a number of operating parameters and a number of reference parameters in particular can be compared in respect of their deviation.

The test injection can in particular be such that no combustion of the fuel injected during the test injection takes place. For example the injected quantity of fuel may be too small for combustion. This for example allows the preheating of a catalytic converter of the internal combustion engine. However provision can also be made for the test injection to result in combustion of the fuel mixture, to prevent higher exhaust gas values due to the non-combusted fuel mixture. In principle the test injection can be a prior or subsequent injection for example or a heat injection for a catalytic converter.

The actuation time for the injector can in particular be predetermined as an actuation parameter for the injection valve to be tested. The injection time is influenced by lambda regulation, cylinder bank equalization functions and non-linearities of the injector. If therefore the injection time is predetermined as the actuation variable for the test injection, such influences are advantageously taken into account automatically. It is however also possible to influence the test injection by controlling the degree of opening of the injector, the actuation height (injector lift), etc.

The pressure measuring facility can of course also be actuated by the control facility to measure more than two pressure values. A pressure profile over time in particular can then be measured, from which it is then possible in turn to determine the differential pressure value.

In one embodiment the operating parameter is the formed differential pressure value and the reference parameter is a setpoint differential pressure value between the fuel pressure in the fuel rail before and after the test injection. With this embodiment an operating parameter to be tested is provided in a particularly simple manner, it being possible to compare it with a previously defined setpoint differential pressure value.

Alternatively or additionally provision can however also be made for the operating parameter to be a fuel quantity determined from the differential pressure value and actually injected during the test injection and for the reference parameter to be a setpoint fuel quantity to be injected during the test injection. If the high-pressure fuel system is considered to be largely leaktight and the compression modulus of the fuel used is known with sufficient accuracy, it is possible to determine an absolute fuel quantity, which was actually injected with the test injection, from the determined differential pressure value with the aid of the following equation:

$$\Delta P = B\left[\alpha \cdot \Delta T - \frac{\Delta m}{\rho \cdot V}\right],$$

where:

$\Delta P$: differential pressure value
B: compression modulus of fuel
$\alpha$: volume expansion coefficient due to temperature
$\Delta T$: temperature change
$\Delta m$: fuel mass actually injected
$\rho$: fuel density
V: volume of fuel distributor system.

With this embodiment it is thus possible to compare the quantity of fuel injected during the test injection directly with the associated predetermined setpoint fuel quantity and to diagnose the injection valve on this basis.

In a further embodiment of the method, the injection valve is actuated for a number of test injections, with a differential pressure value being formed for each of the test injections respectively from the first and second measured fuel pressures. In a corresponding embodiment of the apparatus the control facility is configured to actuate the injection valve for a number of test injections and to form a differential pressure value for each of the test injections respectively from the first and second measured fuel pressures. With this embodiment it is possible to increase the reliability of and information provided by the determined differential pressure values. Provision can be made here for the fuel supply to the fuel rail to be opened between the individual test injections until the operating pressure builds up again and then to be closed again in an overrun cut-off phase before the next test injection. It is however also possible for the fuel supply to the fuel rail to remain closed between test injections.

With this embodiment therefore a number of test injections are carried out by one injection valve. For this provision is particularly preferably made for the operating parameter to be the variance of the formed differential pressure values and for the reference parameter to be a setpoint variance of the differential pressure values. The setpoint variance can in particular also be zero. With this embodiment an increase in the variance of the formed differential pressure values occurring in the event of a defect of the injection valve is used for diagnosis purposes, in that if a previously defined setpoint variance is exceeded, a defect of the injection valve is diagnosed. Alternatively or additionally provision can be made here for the operating parameter to be the variance of fuel quantities determined from the differential pressure values and actually injected during the test injection and for the reference parameter to be a setpoint variance of the fuel quantities.

In a further of the method, at least two injection valves are actuated one after the other for at least one test injection each, with a differential pressure value being formed for each of the injection valves respectively from the first and second measured fuel pressures. Therefore in one embodiment of the apparatus the control facility is configured to actuate at least two injection valves one after the other for at least one test injection each and to form a differential pressure value for each of the injection valves respectively from the first and second measured fuel pressures. With this embodiment it is possible for example to test a number of injection valves one after the other. This embodiment also allows an error diagnosis of an injection valve based on a relative deviation of this injection valve from another injection valve. This can be advantageous in particular where there is a minor leak in the high-pressure fuel system or an inaccuracy in the determination of the compression modulus of the fuel and therefore the absolute calculation of an injected fuel quantity can only be inaccurate.

It is possible again, where a number of valves are actuated for test injections, for the fuel supply to the fuel rail to be opened between the individual test injections until the operating pressure has built up and to be closed again in the overrun cut-off phase for the subsequent test injection. It is likewise also possible again to keep the fuel supply closed between individual test injections. Provision can be particularly advantageously made for the operating parameter to be differential pressure value formed for the first injection valve and for the reference parameter to be the differential pressure value formed for the second injection valve. It is however also possible for the operating parameter alternatively or additionally to be a fuel quantity determined from the respective differential pressure value for the first injection valve and actually injected during the test injection and for the reference parameter to be a fuel quantity determined from the respective differential pressure value for the second injection valve and actually injected during the test injection.

In a further advantageous embodiment of the method provision can be made for each of the at least two injection valves to be actuated for a number of test injections, with a differential pressure value being formed for each of the test injections respectively from the first and second measured fuel pressures. Therefore in a further embodiment of the apparatus the control facility is configured to actuate each of the at least two injection valves for a number of test injections and to form a differential pressure value for each of the test injections respectively from the first and second measured fuel pressures. With this embodiment it is again possible to increase the information provided by the determined differential pressure values of the at least two injection valves.

Provision can be made again here for the operating parameter to be the variance of the differential pressure values formed for the first injection valve and for the reference parameter to be the variance of the differential pressure values formed for the second injection valve. Alternatively or additionally provision can be made for the operating parameter to be the variance of the fuel quantity determined from the differential pressure values for the first injection valve and actually injected during the test injection and for the reference parameter to be the variance of fuel quantities determined from the differential pressure values for the second injection valve and actually injected during the test injection.

If a number of valves are actuated for test injections, in particular more than two injection valves can naturally be actuated. The reference parameter can then be for example a mean value of the differential pressure values or of the fuel quantities determined from the differential pressure values and actually injected or, in the event of a number of actuations of each valve, of the variances of the differential pressure values or the injected fuel quantities for the further actuated injection valves, in other words in particular the second, third, fourth, etc. injection valve.

It has proven in practice that particularly reliable defect identification is achieved when the maximum deviation is at least 25%, preferably at least 50%.

The apparatus according to various embodiments can in particular be configured to execute the method.

The high-pressure fuel system shown in FIG. 1 has a high-pressure fuel pump 1. Connected to the high-pressure pump 1 is a quantity control valve 2, which feeds fuel supplied by the high-pressure fuel pump 1 by way of a supply line 3 to a fuel rail 4. Connected to the fuel rail 4 are a number of injection valves 5. To supply the injection valves 5 with fuel, each injection valve 5 has an injection valve supply line 6 connected to the fuel rail 4. Also shown is a pressure measuring facility in the form of a pressure sensor 7, in the example shown a high-pressure sensor 7. The pressure sensor 7 can be used to measure the fuel pressure in the fuel rail 4. A control facility (ECU) (not shown in detail) is provided to actuate the injection valves 5 and to control further variables of the high-pressure fuel system.

The control facility is provided, in an overrun cut-off phase of the internal combustion engine, in the present instance a spark ignition internal combustion engine, to close off the fuel supply to the fuel rail 4 by way of the quantity control valve 2. A transient phase of the high-pressure fuel system is then awaited, until a stable state is present in the system. The fuel enclosed in the fuel rail 4 is thus kept at a practically constant pressure level. As soon as the stable state is present, the pressure sensor 7 is actuated by the control facility to measure a first fuel pressure in the fuel rail 4. This first fuel pressure is stored in the control facility.

The control facility then actuates an injection valve 5 to be diagnosed to carry out a test injection. The control facility also predetermines an injection time for the test injection. In the example shown the injection time is selected to be so short that such a small fuel quantity is injected that combustion of the fuel quantity does not occur.

After the test injection the pressure sensor 7 is actuated by the control facility such that the pressure sensor 7 measures a second fuel pressure in the fuel rail 4. This measured pressure is also stored in the control facility.

The control facility can also actuate the pressure sensor 7 to carry out more than two pressure measurements, in particular a plurality of pressure measurements. This allows a pressure profile over time to be measured. Such a pressure profile over time in the fuel rail 4 during the test injection is illustrated in the diagram shown in FIG. 2. In the diagram the time in seconds is shown on the x-axis and the pressure in the fuel rail 4 in hectopascals on the y-axis.

At the time of around 7.5 s the fuel supply to the fuel rail was closed off. It can be seen that the pressure in the fuel rail 4 from that point remains essentially constant apart from operational fluctuations. At around 9 s an injection valve 5 to be diagnosed was actuated for a test injection. The diagram therefore shows a significant drop in the fuel pressure in the fuel rail 4. After the end of the test injection, at around 9.2 s, the fuel pressure again remains essentially at the lower pressure level after the test injection, apart from operational fluctuations.

Figure 2:
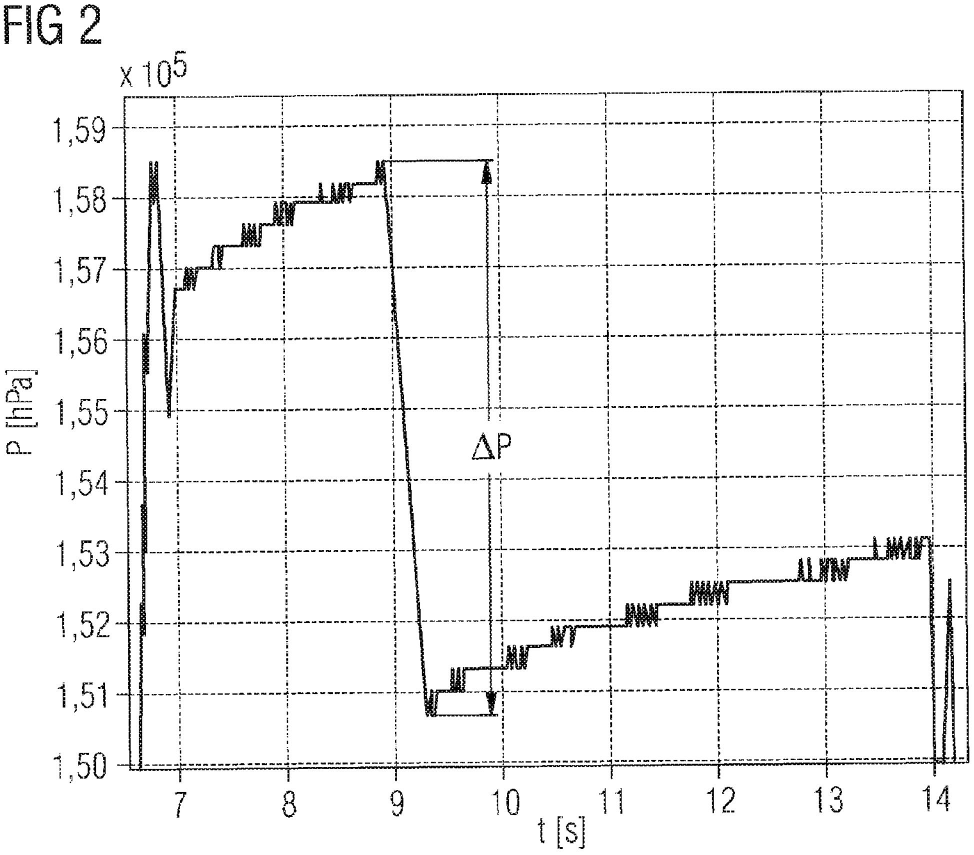
FIG. 2 shows a pressure profile over time in the fuel distributor system shown in FIG. 1, during an test injection of a fuel valve according to various embodiments.

The control facility forms a differential pressure value ΔP from the first and second measured fuel pressures directly before and after the test injection. This is shown in FIG. 2.

According to one embodiment the differential pressure value ΔP thus formed can be selected as an operating parameter of the internal combustion engine and can be compared with a setpoint differential pressure value between the fuel pressure in the fuel rail 4 before and after the test injection, as defined beforehand for the associated test injection. The setpoint differential pressure value here is determined in particular on the basis of the predetermined injection time for the test injection. A corresponding characteristic field can be created beforehand for this purpose. A deviation of the formed differential pressure value from the setpoint differential pressure value can then be determined and if a previously defined maximum deviation, in the example shown 50%, is exceeded, a defect in the actuated injection valve 5 is diagnosed.

Figure 3:
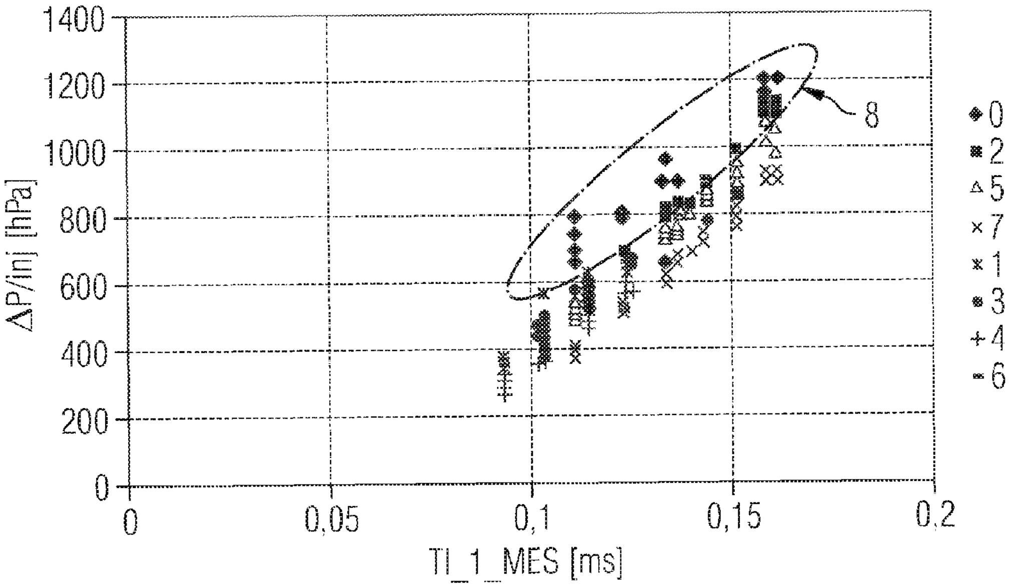
FIG. 3 shows a diagram of various measured differential pressure values according to various embodiments.

FIG. 3 shows a diagram illustrating a further exemplary embodiment. Here the injection time T1_1_MES in milliseconds is shown on the x-axis, for which different injection valves 5 are actuated during test injections. The injection valves are marked with the numbers 0 to 7 in the diagram in FIG. 3, with the different symbols shown to the right of the diagram in FIG. 3 being assigned to the different injection valves. Thus the injection valve with the number 0 is assigned a diamond-shaped symbol for example, the injection valve with the number 2 a square, etc.

The y-axis in the diagram in FIG. 3 shows the differential pressure value ΔP between the fuel pressures measured in hectopascals in the fuel rail 4 before and after the respective test injection for the different injection valves. In the example shown the injection valves were actuated one after the other for ten different injection times for test injections. Each of the eight injection valves was actuated for a number of test injections, in the example shown ten test injections, with a differential pressure value ΔP being formed for each of the test injections of each of the injection valves respectively from the first and second measured fuel pressures before and after the test injection. These differential pressure values ΔP per injection of the different injection valves are shown in the diagram in FIG. 3.

In the example shown the variance of the differential pressure values ΔP determined at one injection time and for one injection valve was calculated as an operating parameter. In the example shown a setpoint variance of the differential pressure values was established beforehand as a reference parameter. In the example shown the setpoint variance was zero. The region of the diagram marked with the reference character 8 in FIG. 3 shows an excessive variance of the differential pressure value for the valve with the number 0 (diamond-shaped measuring points in FIG. 3). In the example shown this excessive variance of the valve with the no. 0 has exceeded a previously defined maximum deviation from the setpoint variance of the differential pressure values. Therefore the valve with the no. 0 has been identified as defective in the example shown.

The valves identified as defective according to FIGS. 2 and 3 can thus be replaced in order to ensure optimal operation of the internal combustion engine. Suitable countermeasures can also be taken, for example switching the internal combustion engine to emergency operation or restricting the speed of the internal combustion engine.

The method and/or apparatus according to various embodiments thus allow(s) in particular rapidly occurring and therefore unanticipated defects of individual injection valves to be identified and suitable countermeasures to be taken. The method and apparatus here are independent of the exhaust gas system configuration of the internal combustion engine.

What is claimed is:

1. A method for diagnosing an injection valve of an internal combustion engine connected to a fuel rail, comprising the following steps:

closing off the fuel supply to the fuel rail in an overrun cut-off phase of the internal combustion engine, after the fuel supply has been closed off, measuring a first fuel pressure in the fuel rail, after the first fuel pressure measurement, actuating an injection valve for at least one test injection, after the at least one test injection, measuring a second fuel pressure in the fuel rail, forming a differential pressure value from the first and second measured fuel pressures, determining a deviation of an operating parameter from a reference parameter from the differential pressure value and if a previously defined maximum deviation of the operating parameter from the reference parameter is exceeded, identifying the injection valve as defective.

2. The method according to claim 1, wherein the operating parameter is the formed differential pressure value and the reference parameter is a setpoint differential pressure value between the fuel pressure in the fuel rail before and after the test injection.

3. The method according to claim 1, wherein the operating parameter is a fuel quantity determined from the differential pressure value and actually injected during the test injection and the reference parameter is a setpoint fuel quantity to be injected during the test injection.

4. The method according to claim 1, wherein the injection valve is actuated for a number of test injections, with a differential pressure value being formed for each of the test injections respectively from the first and second measured fuel pressures.

5. The method according to claim 4, wherein the operating parameter is the variance of the formed differential pressure values and the reference parameter is a setpoint variance of the differential pressure values.

6. The method according to claim 4, wherein the operating parameter is the variance of fuel quantities determined from the differential pressure values and actually injected during the test injection and the reference parameter is a setpoint variance of the fuel quantities.

7. The method according to claim 1, wherein at least two injection valves are actuated one after the other for at least one test injection each, with a differential pressure value being formed for each of the injection valves respectively from the first and second measured fuel pressures.

8. The method according to claim 7, wherein the operating parameter is the differential pressure value formed for the first injection valve and the reference parameter is the differential pressure value formed for the second injection valve.

9. The method according to claim 7, wherein the operating parameter is a fuel quantity determined for the first injection valve from the respective differential pressure value and actually injected during the test injection and the reference parameter is a fuel quantity determined for the second injection valve from the respective differential pressure value and actually injected during the test injection.

10. The method according to claim 7, wherein each of the at least two injection valves is actuated for a number of test injections, with a differential pressure value being formed for each of the test injections respectively from the first and second measured fuel pressures.

11. The method according to claim 10, wherein the operating parameter is the variance of the differential pressure values formed for the first injection valve and the reference parameter is the variance of the differential pressure values formed for the second injection valve.

12. The method according to claim 10, wherein the operating parameter is the variance of fuel quantities determined from the differential pressure values for the first injection valve and actually injected during the test injection and the reference parameter is the variance of fuel quantities determined from the differential pressure values for the second injection valve and actually injected during the test injection.

13. The method according claim 1, wherein the maximum deviation is at least 25%.

14. An apparatus for diagnosing an injection valve of an internal combustion engine connected to a fuel rail, comprising pressure measuring means configured to measure a fuel pressure in the fuel rail and a control means being operable:

to close off the fuel supply to the fuel rail in an overrun cut-off phase of the internal combustion engine, to actuate the pressure measuring facility such that it measures a first fuel pressure in the fuel rail after the fuel supply has been closed off, to actuate an injection valve for at least one test injection after the first fuel pressure measurement, to actuate the pressure measuring facility such that it measures a second fuel pressure in the fuel rail after the at least one test injection, to form a differential pressure value from the first and second measured fuel pressures, and to determine a deviation of an operating parameter from a reference parameter from the differential pressure value and, if a previously defined maximum deviation of the operating parameter from the reference parameter is exceeded, to identify the injection valve as defective.

15. The apparatus according to claim 14, wherein the operating parameter is the formed differential pressure value and the reference parameter is a setpoint differential ressure value between the fuel pressure in the fuel rail before and after the test injection.

16. The apparatus according to claim 14, wherein the operating parameter is a fuel quantity determined from the differential pressure value and actually injected during the test injection and the reference parameter is a setpoint fuel quantity to be injected during the test injection.

17. The apparatus according to claim 14, wherein the control facility is configured to actuate the injection valve for a number of test injections and to form a differential pressure value for each of the test injections respectively from the first and second measured fuel pressures.

18. The apparatus according to claim 17, wherein the operating parameter is the variance of the formed differential pressure values and the reference parameter is a setpoint variance of the differential pressure values.

19. The apparatus according to claim 17, wherein the operating parameter is the variance of fuel quantities determined from the differential pressure values and actually injected during the test injection and the reference parameter is a setpoint variance of the fuel quantities.

20. The apparatus according to claim 14, wherein the control facility is configured to actuate at least two injection valves one after the other for at least one test injection each and to form a differential pressure value for each of the injection valves respectively from the first and second measured fuel pressures.

21. The apparatus according to claim 20, wherein the operating parameter is the differential pressure value formed for the first injection valve and the reference parameter is the differential pressure value formed for the second injection valve.

22. The apparatus according to claim 20, wherein the operating parameter is a fuel quantity determined for the first injection valve from the respective differential pressure value and actually injected during the test injection and the reference parameter is a fuel quantity determined for the second injection valve from the respective differential pressure value and actually injected during the test injection.

23. The apparatus according to claim 20, wherein the control facility is configured to actuate each of the at least two injection valves for a number of test injections and to form a differential pressure value for each of the test injections respectively from the first and second measured fuel pressures.

24. The apparatus according to claim 23, wherein the operating parameter is the variance of the differential pressure values formed for the first injection valve and the reference parameter is the variance of the differential pressure values formed for the second injection valve.

25. The apparatus according to claim 23, wherein the operating parameter is the variance of fuel quantities determined from the differential pressure values for the first injection valve and actually injected during the test injection and the reference parameter is the variance of fuel quantities determined from the differential pressure values for the second injection valve and actually injected during the test injection.

26. The apparatus according to claim 14, wherein the maximum deviation is at least 25%.

* * * * *